(12) United States Patent
Ito et al.

(10) Patent No.: US 12,735,154 B2
(45) Date of Patent: Sep. 15, 2026

(54) FISHING SITE SELECTION SYSTEM, FISHING SITE SELECTION METHOD, AND SERVER FOR SELECTING FISHING SITE

(71) Applicant: YAMAHA HATSUDOKI KABUSHIKI KAISHA, Iwata (JP)

(72) Inventors: Makoto Ito, Shizuoka (JP); Hidehiko Harada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 219 days.

(21) Appl. No.: 18/540,947

(22) Filed: Dec. 15, 2023

(65) Prior Publication Data

US 2024/0199178 A1 Jun. 20, 2024

(30) Foreign Application Priority Data

Dec. 16, 2022 (JP) ................................ 2022-201255

(51) Int. Cl.
*B63B 49/00* (2006.01)
*A01K 99/00* (2006.01)
(Continued)

(52) U.S. Cl.
CPC .............. *B63B 49/00* (2013.01); *A01K 99/00* (2013.01); *B63B 79/10* (2020.01); *B63B 79/40* (2020.01);
(Continued)

(58) Field of Classification Search
CPC ................................ B63B 79/40; B63B 49/00
See application file for complete search history.

(56) References Cited

U.S. PATENT DOCUMENTS

2006/0054098 A1 3/2006 Congel et al.
2009/0105952 A1* 4/2009 Grace .................... A01K 85/00 701/300
(Continued)

FOREIGN PATENT DOCUMENTS

CN 115408424 A 11/2022
JP 2006-158239 A 6/2006
(Continued)

OTHER PUBLICATIONS

Official Communication issued in corresponding European Patent Application No. 23211948.7, mailed on Jul. 30, 2024.

*Primary Examiner* — Jess Whittington
(74) *Attorney, Agent, or Firm* — Keating & Bennett, LLP

(57) ABSTRACT

A fishing site information providing system includes an input operable by an operator to select a fishing-related watercraft operating function of a marine propulsion device on a watercraft. A watercraft operating controller is connected to the input and controls the marine propulsion device to execute the fishing-related watercraft operating function selected by the operator. A Data Communication Module (DCM) transmits to a cloud server the fishing-related watercraft operating function executed by the marine propulsion device and execution information including a site of execution of the fishing-related watercraft operating function. The cloud server estimates a recommended fishing site or sea route based on the fishing-related watercraft operating function and the execution information and transmits the estimated recommended fishing site or sea route to the DCM. The watercraft operating controller controls a Multi-Function Display (MFD) to display the recommended fishing site or sea route estimated by the cloud server.

19 Claims, 17 Drawing Sheets

(51) Int. Cl.

| | |
|---|---|
| ***B63B 79/10*** | (2020.01) |
| ***B63B 79/40*** | (2020.01) |
| ***B63H 21/21*** | (2006.01) |
| ***G01C 21/20*** | (2006.01) |

(52) U.S. Cl.

CPC ........... *B63H 21/21* (2013.01); *G01C 21/203* (2013.01); *B63B 2213/02* (2013.01); *B63H 2021/216* (2013.01)

(56) References Cited

U.S. PATENT DOCUMENTS

| | | | | |
|---|---|---|---|---|
| 2015/0058323 | A1* | 2/2015 | Bailey | A01K 79/00 707/736 |
| 2018/0292215 | A1* | 10/2018 | Akuzawa | B63B 49/00 |
| 2022/0073180 | A1* | 3/2022 | Salmon | B63B 17/00 |
| 2023/0358549 | A1* | 11/2023 | Niu | G01C 21/203 |
| 2023/0367008 | A1* | 11/2023 | Freeman | B63H 20/007 |

FOREIGN PATENT DOCUMENTS

| | | | |
|---|---|---|---|
| JP | 2020-013339 | A | 1/2020 |
| JP | 2020-160749 | A | 10/2020 |

* cited by examiner

FISHING SITE SELECTION SYSTEM, FISHING SITE SELECTION METHOD, AND SERVER FOR SELECTING FISHING SITE

CROSS REFERENCE TO RELATED APPLICATIONS

This application claims the benefit of priority to Japanese Patent Application No. 2022-201255 filed on Dec. 16, 2022. The entire contents of this application are hereby incorporated herein by reference.

BACKGROUND OF THE INVENTION

1. Field of the Invention

The present invention relates to fishing site information providing systems, fishing site information providing methods, and servers.

2. Description of the Related Art

There has been disclosed a device that uploads information of fish catches, hydrographic conditions, and so forth to a cloud, conducts an AI (Artificial Intelligence) based analysis for the uploaded information, and suggests a recommended fishing ground (e.g., Japan Laid-open Patent Application Publications Nos. 2020-160749 and 2006-158239). On the other hand, there also exists a type of software application that enables a user to conduct historical management and analysis for one's own fishing by causing the user to input results of one's own fishing (e.g., https://www.anglr.com/features).

By contrast, there has been also disclosed a technology for automatically determining whether or not a watercraft is in an operating state (i.e., the watercraft is operated to search catch targets) without informational input by a user (e.g., Japan Laid-open Patent Application Publication No. 2020-13339). In Japan Laid-open Patent Application Publication No. 2020-13339, it is determined whether or not the watercraft is in the operating state based on speed information obtained from positional information and status-identifiable information of the watercraft.

However, the user is required to perform bothersome work in the use of such functions as described in Japan Laid-open Patent Application Publications Nos. 2020-160749 and 2006-158239 and https://www.anglr.com/features. First, the user is required to continue inputting information of one's own fish catch. If the user forgets to input the information, the information is not reflected on a database and the user cannot fully utilize the functions.

In the technology described in Japan Laid-open Patent Application Publication No. 2020-13339, it is automatically determined whether or not the watercraft is in the operating state without informational input by the user. However, it is determined whether or not the watercraft is in a state of commercial or recreational fishing based on the positional information and movement of the watercraft such that it is difficult to enhance the accuracy of the determination. For example, even when the watercraft stays in approximately the same position, it is difficult to distinguish between whether the watercraft does so for conducting fishing in a fixed spot and whether the watercraft simply stops in a no wind or wave condition. On the other hand, when the watercraft is moving slowly, it is difficult to distinguish between whether the watercraft is simply drifting with tide and whether the watercraft is moving slowly while trolling.

SUMMARY OF THE INVENTION

Example embodiments of the present invention provide fishing site information providing systems, fishing site information providing methods, and servers that each accurately determine that fishing has been conducted without requiring an operator to perform bothersome work and suggest to the operator a recommended fishing site.

A fishing site information providing system according to a first example embodiment of the present invention includes a server and a watercraft. The watercraft includes a position detector, a marine propulsion device, an input, and a controller. The position detector detects a position of the watercraft. The input is operable by an operator to select a fishing-related watercraft operating function of the marine propulsion device. The controller is connected to the input and is configured or programmed to control the marine propulsion device to execute the fishing-related watercraft operating function selected by the operator. The controller is connectable to a communication device and a display. The communication device transmits to the server the fishing-related watercraft operating function executed by the marine propulsion device and execution information including a site of execution of the fishing-related watercraft operating function. The server is configured or programmed to estimate a recommended fishing site or sea route based on the fishing-related watercraft operating function and the execution information, and transmit the recommended fishing site or sea route to the communication device. The controller controls the display to display the recommended fishing site or sea route estimated by the server.

A fishing site information providing method according to a second example embodiment of the present invention includes the following processes. A first process causes a communication device to transmit to a server a fishing-related watercraft operating function executed in a watercraft and execution information including a site of execution of the fishing-related watercraft operating function. The second process causes the server to estimate a recommended fishing site or sea route based on the fishing-related watercraft operating function and the execution information. The third process causes the server to transmit to the communication device the recommended fishing site or sea route estimated by the server. The fourth process causes a display to display the recommended fishing site or sea route estimated by the server.

A server according to a third example embodiment of the present invention includes a reception section, an estimation section, and a transmission section. The reception section receives a fishing-related watercraft operating function executed in a watercraft and execution information including a site of execution of the fishing-related watercraft operating function. The estimation section estimates a recommended fishing site or sea route based on the fishing-related watercraft operating function and the execution information. The transmission section transmits the recommended fishing site or sea route estimated by the estimation section to a communication device of the watercraft.

Overall, when the fishing-related watercraft operating function has been executed, it is deduced that fishing has been conducted in the site of execution of the fishing-related watercraft operation function. Thus, it is possible to accurately determine whether or not fishing has been conducted. Additionally, the fishing-related watercraft operating function and the execution information are transmitted from the watercraft to the server, thus, manual input work is not required for the operator. In other words, it is possible to accumulate information related to fishing in the server without requiring the operator to perform bothersome work. This makes it possible for the server to estimate a recommended fishing site and suggest to the operator the recommended fishing site without requiring the operator to perform bothersome work.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Fishing site information providing systems, servers, and fishing site information providing methods according to example embodiments of the present invention will be hereinafter explained with reference to drawings.

Figure 1:
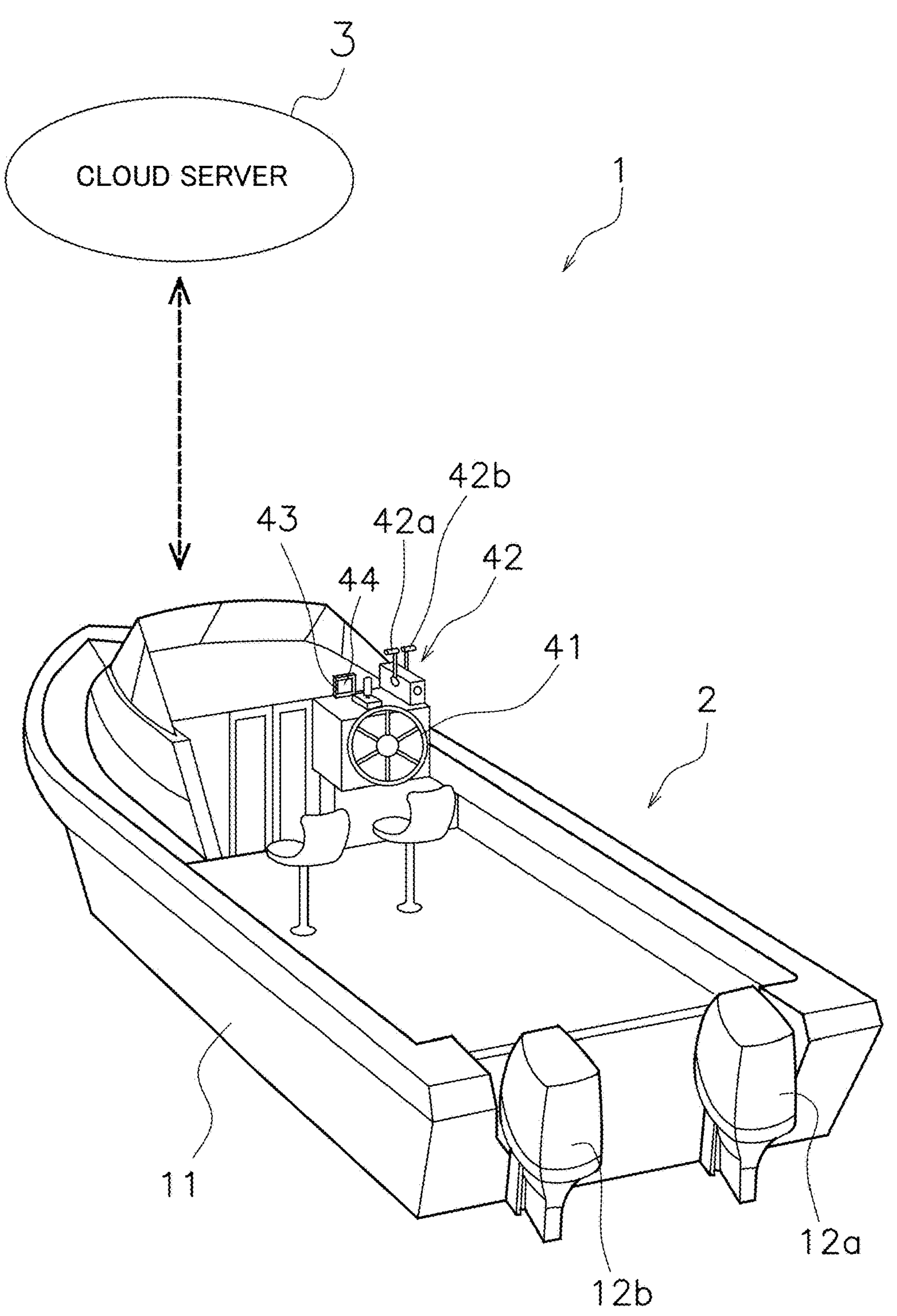
FIG. 1 is a diagram showing a configuration of a fishing site information providing system according to an example embodiment of the present invention.

FIG. 1 is a diagram showing a fishing site information providing system 1 according to an example embodiment. The fishing site information providing system 1 includes a watercraft 2 and a cloud server 3 (an example of a server). The watercraft 2 transmits to the cloud server 3 a fishing-related watercraft operating function executed therein and execution formation including a site of execution of the fishing-related watercraft operating function. The cloud server 3 estimates a recommended fishing site or sea route based on the fishing-related watercraft operating function and the execution information and then transmits the estimated fishing site or sea route to the watercraft 2. The watercraft 2 displays the recommended fishing site or sea route, received from the cloud server 3, on a MFD (Multi-Function Display) 43 (an example of a display).

The watercraft 2 includes a watercraft body 11, a first marine propulsion device 12*a*, and a second marine propulsion device 12*b*. It should be noted that the number of marine propulsion devices is not limited to two. The number of the marine propulsion devices may be one. Alternatively, the number of marine propulsion devices may be more than two.

The first and second marine propulsion devices 12*a* and 12*b* are attached to the stern of the watercraft body 11. The first and second marine propulsion devices 12*a* and 12*b* are, for example, outboard motors. The first and second marine propulsion devices 12*a* and 12*b* are aligned in the width direction of the watercraft body 11. Specifically, the first marine propulsion device 12*a* is disposed on the starboard side of the watercraft body 11. The second marine propulsion device 12*b* is disposed on the port side of the watercraft body 11. The first and second marine propulsion devices 12*a* and 12*b* each generate a thrust to propel the watercraft body 11.

Figure 2:
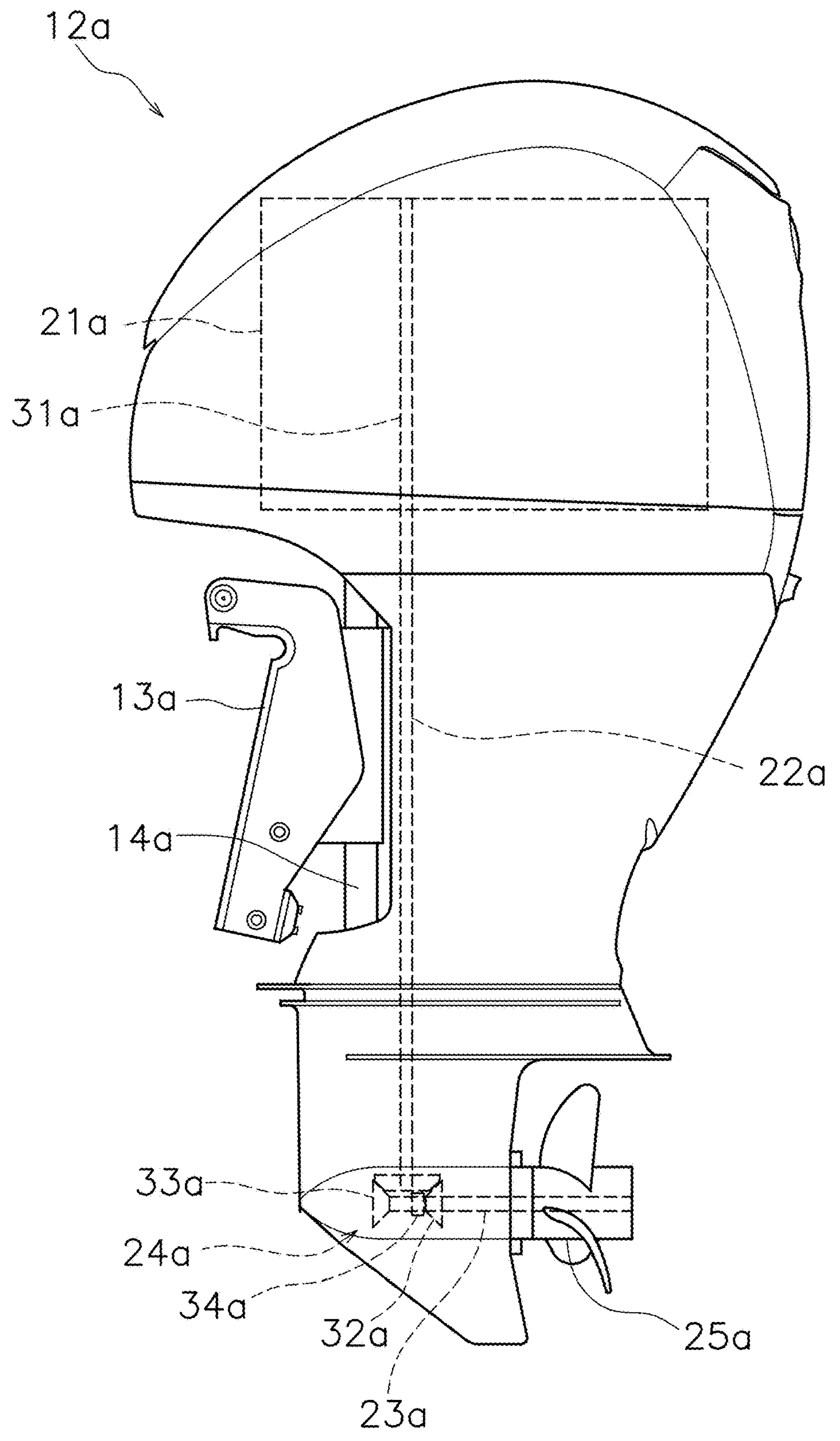
FIG. 2 is a side view of a marine propulsion device.

FIG. 2 is a side view of the first marine propulsion device 12*a*. The structure of the first marine propulsion device 12*a* will be hereinafter explained. However, the structure of the second marine propulsion device 12*b* also has a same structure as the first marine propulsion device 12*a*. The first marine propulsion device 12*a* is attached to the watercraft body 11 through a bracket 13*a*. The bracket 13*a* supports the first marine propulsion device 12*a* such that the first marine propulsion device 12*a* is rotatable about a first steering shaft 14*a*. The first steering shaft 14*a* extends in the up-and-down direction of the first marine propulsion device 12*a*.

The first marine propulsion device 12*a* includes a first engine 21*a*, a first drive shaft 22*a*, a first propeller shaft 23*a*, and a first shift mechanism 24*a*. The first engine 21*a* generates the thrust to propel the watercraft 2. The first engine 21*a* is, for example, an internal combustion engine. The first engine 21*a* includes a crankshaft 31*a*. The crankshaft 31*a* extends in the up-and-down direction of the first marine propulsion device 12*a*. The first drive shaft 22*a* is connected to the crankshaft 31*a*. The first drive shaft 22*a* extends in the up-and-down direction of the first marine propulsion device 12*a*. The first propeller shaft 23*a* extends in the back-and-forth direction of the first marine propulsion device 12*a*. The first propeller shaft 23*a* is connected to the first drive shaft 22*a* through the first shift mechanism 24*a*. A propeller 25*a* is attached to the first propeller shaft 23*a*.

The first shift mechanism 24*a* includes a forward moving gear 32*a*, a rearward moving gear 33*a*, and a dog clutch 34*a*. When gear engagement of each gear 32*a*, 33*a* is switched by the dog clutch 34*a*, the direction of rotation transmitted from the first drive shaft 22*a* to the first propeller shaft 23*a* is switched. Movement of the watercraft 2 is thus switched between forward movement and rearward movement.

More specifically, the first shift mechanism 24*a* is switchable among a forward moving state, a rearward moving state, and a neutral state. When the first shift mechanism 24*a* is set in the forward moving state, the dog clutch 34*a* is connected to the forward moving gear 32*a*. Accordingly, the rotation of the first drive shaft 22*a* is transmitted to the first propeller shaft 23*a* so as to rotate the first propeller shaft 23*a* in a corresponding direction to forward movement. When the first shift mechanism 24*a* is set in the rearward moving state, the dog clutch 34*a* is connected to the rearward moving gear 33*a*. Accordingly, the rotation of the first drive shaft 22*a* is transmitted to the first propeller shaft 23*a* so as to rotate the first propeller shaft 23*a* in a corresponding direction to rearward movement. When the first shift mechanism 24*a* is set in the neutral state, the dog clutch 34*a* is released from being connected to each of the forward moving gear 32*a* and the rearward moving gear 33*a*. Accordingly, the rotation of the first drive shaft 22*a* is not transmitted to the first propeller shaft 23*a*.

Figure 3:
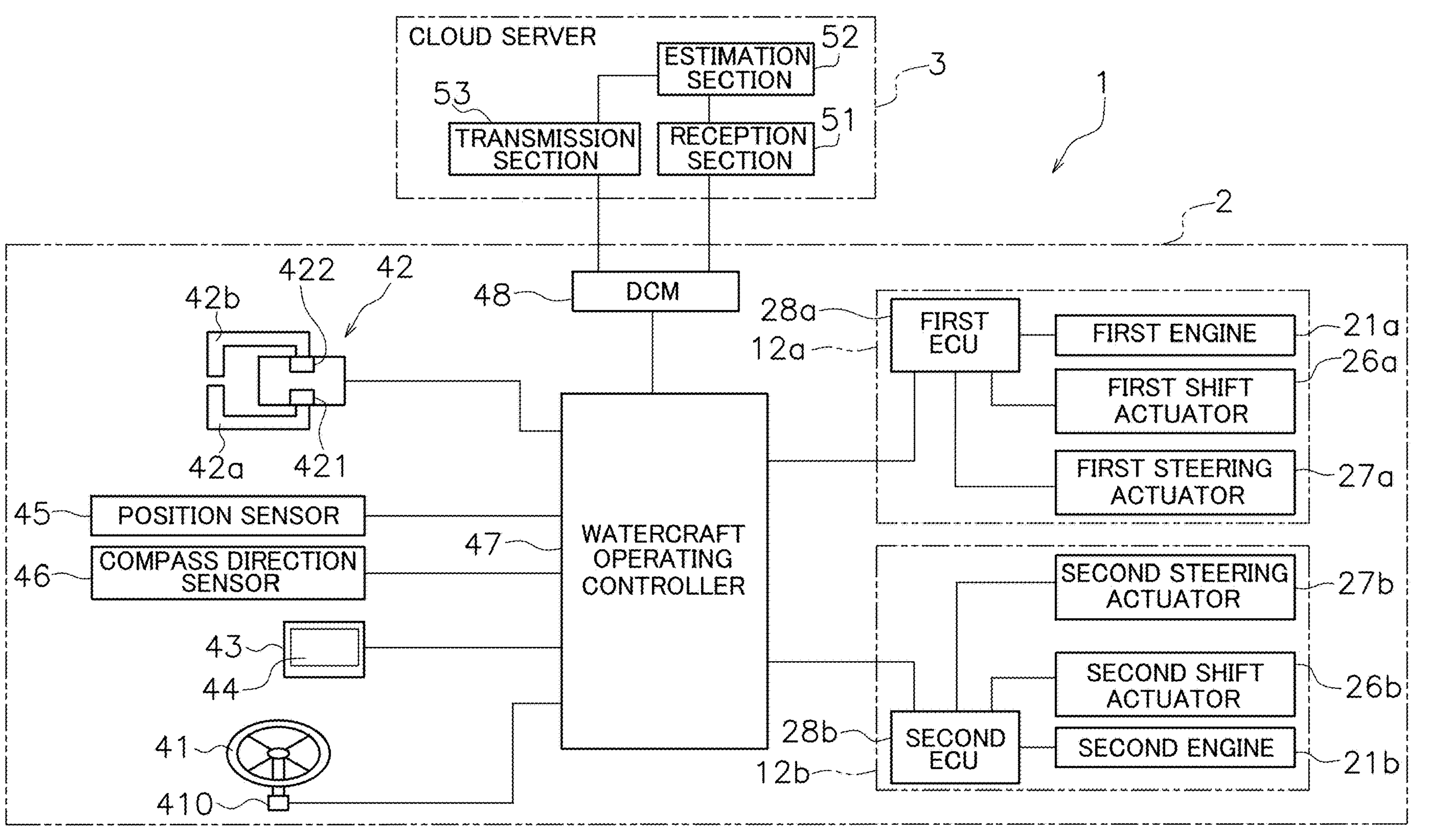
FIG. 3 is a block diagram showing the configuration of the fishing site information providing system.

FIG. 3 is a schematic diagram showing a configuration of the fishing site information providing system 1. As shown in FIG. 3, the first marine propulsion device 12*a* includes a first shift actuator 26*a* and a first steering actuator 27*a*. The first shift actuator 26*a* is connected to the dog clutch 34*a* of the first shift mechanism 24*a*. The first shift actuator 26*a* actuates the dog clutch 34*a* to switch gear engagement of each gear 32*a*, 33*a*. Movement of the watercraft 2 is thus switched between forward movement and rearward movement. The first shift actuator 26*a* is, for instance, an electric motor. However, the first shift actuator 26*a* may be another type of actuator such as an electric cylinder, a hydraulic motor, or a hydraulic cylinder. The first steering actuator 27*a* is provided in the watercraft body 11 and is connected to the first marine propulsion device 12*a*. The first steering actuator 27*a* rotates the first marine propulsion device 12*a* about the first steering shaft 14*a*. Accordingly, the first marine propulsion device 12*a* is changed in rudder angle. The rudder angle refers to the angle of the first propeller shaft 23*a* with respect to the back-and-forth direction of the first marine propulsion device 12*a*. The first steering actuator 27*a* is, for instance, an electric motor. However, the first steering actuator 27*a* may be another type of actuator such as an electric cylinder, a hydraulic motor, or a hydraulic cylinder.

The first marine propulsion device 12*a* includes a first ECU (Electric Control Unit) 28*a*. The first ECU 28*a* includes a processor such as a CPU (Central Processing Unit) and memories such as a RAM (Random Access Memory) and a ROM (Read Only Memory). The first ECU 28*a* stores programs and data to control the first marine propulsion device 12*a*. The first ECU 28*a* controls the first engine 21*a*.

The second marine propulsion device 12*b* includes a second engine 21*b*, a second shift actuator 26*b*, a second steering actuator 27*b*, and a second ECU 28*b*. The second marine propulsion device 12*b* is rotatable about a second steering shaft (configured in similar manner to the first steering shaft 14*a* shown in FIG. 2, albeit not shown in the drawings). The second engine 21*b*, the second shift actuator 26*b*, the second steering actuator 27*b*, and the second ECU 28*b* in the second marine propulsion device 12*b* are configured in similar manner to the first engine 21*a*, the first shift actuator 26*a*, the first steering actuator 27*a*, and the first ECU 28*a* in the first marine propulsion device 12*a*, respectively.

The watercraft 2 includes a steering wheel 41, a remote controller 42, and the MFD (Multi-Function Display) 43. As shown in FIG. 1, the steering wheel 41, the remote controller 42, and the MFD 43 are disposed in a cockpit of the watercraft 2.

The steering wheel 41 allows an operator to manipulate the turning direction of the watercraft 2. The steering wheel 41 includes a sensor 410. The sensor 410 outputs a steering signal indicating the operating direction and the operating amount of the steering wheel 41.

The remote controller 42 includes a first throttle lever 42*a* and a second throttle lever 42*b*. The first throttle lever 42*a* allows the operator to regulate the magnitude of the thrust generated by the first marine propulsion device 12*a*. The first throttle lever 42*a* also allows the operator to switch the direction of the thrust generated by the first marine propulsion device 12*a* between a forward moving direction and a rearward moving direction. The first throttle lever 42*a* is operable from a neutral position to a forward moving directional side and a rearward moving directional side. The neutral position is a position located between the forward moving directional side and the rearward moving directional side. The first throttle lever 42*a* includes a sensor 421. The sensor 421 outputs a first throttle signal indicating the operating direction and the operating amount of the first throttle lever 42*a*.

The second throttle lever 42*b* allows the operator to regulate the magnitude of the thrust generated by the second marine propulsion device 12*b*. The second throttle lever 42*b* also allows the operator to switch the direction of the thrust generated by the second marine propulsion device 12*b* between the forward moving direction and the rearward moving direction. The second throttle lever 42*b* is configured in similar manner to the first throttle lever 42*a*. The second throttle lever 42*b* includes a sensor 422. The sensor 422 outputs a second throttle signal indicating the operating direction and the operating amount of the second throttle lever 42*b*.

The MFD 43 displays a nautical chart and atmospheric phenomena. The atmospheric phenomena include wind direction, wind speed, water temperature, air temperature, precipitation, and so forth. The MFD 43 displays fishing-related watercraft operating functions selectable by the operator. Although described below in detail, the fishing-related watercraft operating functions include a position maintaining function, a compass direction maintaining function, a predetermined navigation function, and so forth. The MFD 43 displays information regarding a recommended fishing site or a recommended sea route received from the cloud server 3. The MFD 43 displays the velocity of watercraft and the rotational speed of engine.

The MFD 43 includes an input 44 (an example of a selector). The input 44 can be a touchscreen but may switches, buttons, or so forth. The input 44 is operable by the operator to select one of the fishing-related watercraft operating functions (described below in detail) displayed on the MFD 43. The input 44 outputs a function selecting signal indicating a selected one of the fishing-related watercraft operating functions. The input 44 is operable by the operator to select one of sea areas recommended for fishing displayed on the MFD 43. The input 44 outputs a sea area selecting signal indicating a selected one of the sea areas. The input 44 may receive fishing result information inputted by the operator as an example of a fishing result information input.

The watercraft 2 includes a position sensor 45 (an example of a position detector) and a compass direction sensor 46. The position sensor 45 detects the present position of the watercraft 2. The position sensor 45 is a GNSS (Global Navigation Satellite System) receiver such as a GPS (Global Positioning System) receiver. However, the position sensor 45 may be a type of sensor other than the GNSS receiver. The position sensor 45 outputs a position signal indicating the present position of the watercraft 2.

The watercraft 2 includes the compass direction sensor 46. The compass direction sensor 46 detects the present compass direction of the watercraft 2. The compass direction sensor 46 is, for instance, an electronic compass. However, the compass direction sensor 46 may be a type of sensor other than the electronic compass. The compass direction sensor 46 outputs a compass direction signal indicating the present compass direction of the watercraft 2.

The watercraft 2 includes a watercraft operating controller 47. The watercraft operating controller 47 includes a processor such as a CPU and memories such as a RAM and a ROM. The watercraft operating controller 47 stores programs and data to control the first and second marine propulsion devices 12*a* and 12*b*.

The watercraft operating controller 47 is connected to the first and second ECUs 28*a* and 28*b* through wired or wireless communication. The watercraft operating controller 47 is connected to the steering wheel 41, the remote controller 42, and the MFD 43.

The watercraft operating controller 47 receives the steering signal from the sensor 410. The watercraft operating controller 47 receives the throttle signal from the sensor 421, 422. The watercraft operating controller 47 receives the setting signals from the input 44. The watercraft operating controller 47 outputs command signals to the first and second ECUs 28*a* and 28*b* based on the signals transmitted thereto from the sensors 410, 421, and 422 and the input 44.

The command signals are transmitted to the first engine 21*a*, the first shift actuator 26*a*, and the first steering actuator 27*a* through the first ECU 28*a*. The command signals are transmitted to the second engine 21*b*, the second shift actuator 26*b*, and the second steering actuator 27*b* through the second ECU 28*b*.

The watercraft operating controller 47 outputs a first shift command for the first shift actuator 26*a* in accordance with the operating direction of the first throttle lever 42*a*. In response, shifting between a forward moving action and a rearward moving action by the first marine propulsion device 12*a* is performed. The watercraft operating controller 47 outputs a first throttle command for the first engine 21*a* in accordance with the operating amount of the first throttle lever 42*a*. The first ECU 28*a* controls the thrust of the first marine propulsion device 12*a* in accordance with the first throttle command. It should be noted that the first throttle signal outputted from the sensor 421 may be directly inputted to the first ECU 28*a*. The first ECU 28*a* may output the first throttle command to the first engine 21*a* in accordance with the first throttle signal inputted thereto from the sensor 421.

The watercraft operating controller 47 outputs a second shift command for the second shift actuator 26*b* in accordance with the operating direction of the second throttle lever 42*b*. In response, switching between a forward moving action and a rearward moving action by the second marine propulsion device 12*b* is performed. The watercraft operating controller 47 outputs a second throttle command for the second engine 21*b* in accordance with the operating amount of the second throttle lever 42*b*. The second ECU 28*b* controls the thrust of the second marine propulsion device 12*b* in accordance with the second throttle command. It should be noted that the second throttle signal outputted from the sensor 422 may be directly inputted to the second ECU 28*b*. The second ECU 28*b* may output the second throttle command to the second engine 21*b* in accordance with the second throttle signal inputted thereto from the sensor 422.

The watercraft operating controller 47 outputs command signals for the first and second steering actuators 27*a* and 27*b* in accordance with the operating direction and the operating amount of the steering wheel 41. When the steering wheel 41 is operated leftward from the neutral position, the watercraft operating controller 47 controls the first and second steering actuators 27*a* and 27*b* such that the first and second marine propulsion devices 12*a* and 12*b* are rotated rightward. The watercraft 2 thus turns leftward.

When the steering wheel 41 is operated rightward from the neutral position, the watercraft operating controller 47 controls the first and second steering actuators 27*a* and 27*b* such that the first and second marine propulsion devices 12*a* and 12*b* are rotated leftward. The watercraft 2 thus turns rightward. The watercraft operating controller 47 also controls the rudder angle of the first marine propulsion device 12*a* and that of the second marine propulsion device 12*b* in accordance with the operating amount of the steering wheel 41.

The watercraft operating controller 47 is connected to the position sensor 45 in a communicable manner. The watercraft operating controller 47 obtains the position of the watercraft 2 based on the position signal transmitted thereto from the position sensor 45. The watercraft operating controller 47 also obtains the velocity of the watercraft 2 based on the position signal transmitted thereto from the position sensor 45. The watercraft 2 may include an additional sensor to detect the velocity of watercraft. The watercraft operating controller 47 is connected to the compass direction sensor 46 in a communicable manner. The watercraft operating controller 47 obtains the present compass direction of the watercraft 2 based on the compass direction signal transmitted thereto from the compass direction sensor 46.

The watercraft operating controller 47 automatically controls the watercraft 2 under a predetermined one of the fishing-related watercraft operating functions based on the setting signal transmitted thereto from the input 44. Under the predetermined fishing-related watercraft operating function, the watercraft operating controller 47 controls each marine propulsion device 12*a*, 12*b* and each steering actuator 27*a*, 27*b* such that the watercraft 2 moves along a predetermined sea route.

Figures 4A, 4B:
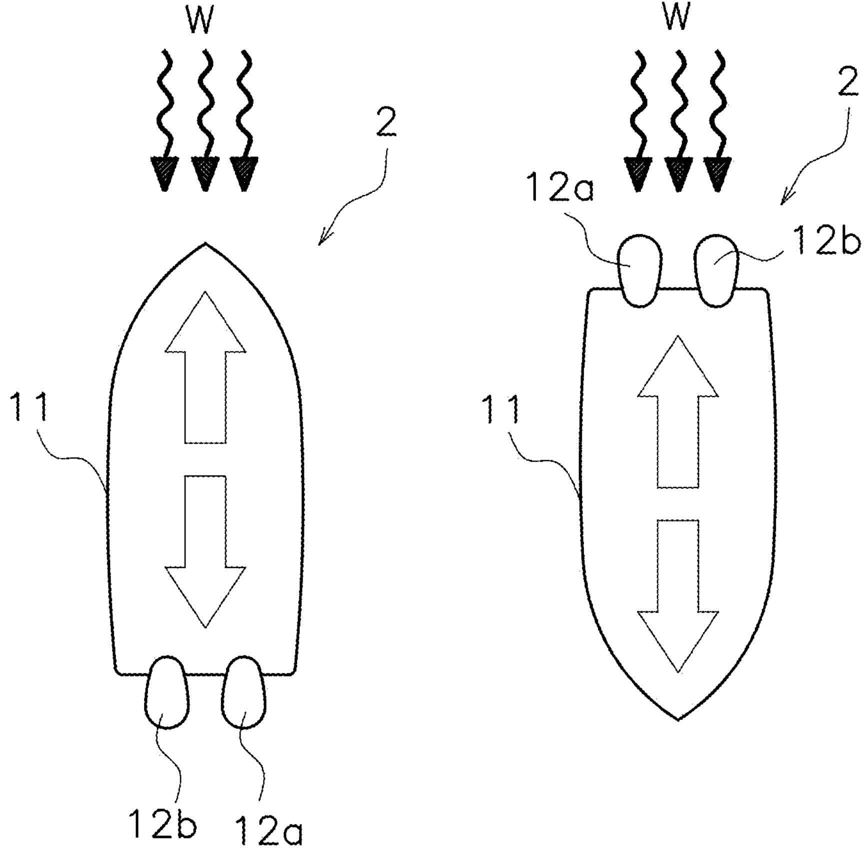
FIG. 4A is a diagram for explaining a position maintaining function.
FIG. 4B is a diagram for explaining a position maintaining function.

The position maintaining function (Fish Point™ function) is provided as one of the fishing-related watercraft operating functions. For example, the position maintaining function is used to conduct fishing in a stationary state of watercraft. FIGS. 4A and 4B are diagrams for explaining the position maintaining function. In FIG. 4A, the position maintaining function is executed such that the position of the watercraft 2 can be maintained by slightly moving the watercraft 2 back and forth in a condition of wind W blowing from the bow side to the stern side of the watercraft 2. In FIG. 4B, the position maintaining function is executed such that the position of the watercraft 2 can be maintained by slightly moving the watercraft 2 back and forth in a condition of wind W blowing from the stern side to the bow side of the watercraft 2. When the position maintaining function is selected with the input 44, the watercraft operating controller 47 controls each marine propulsion device 12*a*, 12*b* based on the position signal transmitted thereto from the position sensor 45, for instance, such that the watercraft 2 can be kept located in a predetermined position as much as possible, while being regulated to be moved back and forth at a quite low velocity. The predetermined position, at which the watercraft 2 is maintained, may be set by selecting a position on the nautical chart displayed on the MFD 43. The predetermined position, at which the watercraft 2 is maintained, may be set by allowing the operator to select the position maintaining function with the input 44 when the watercraft 2 reaches a position where it is intended or desired to maintain the watercraft 2.

Figure 5:
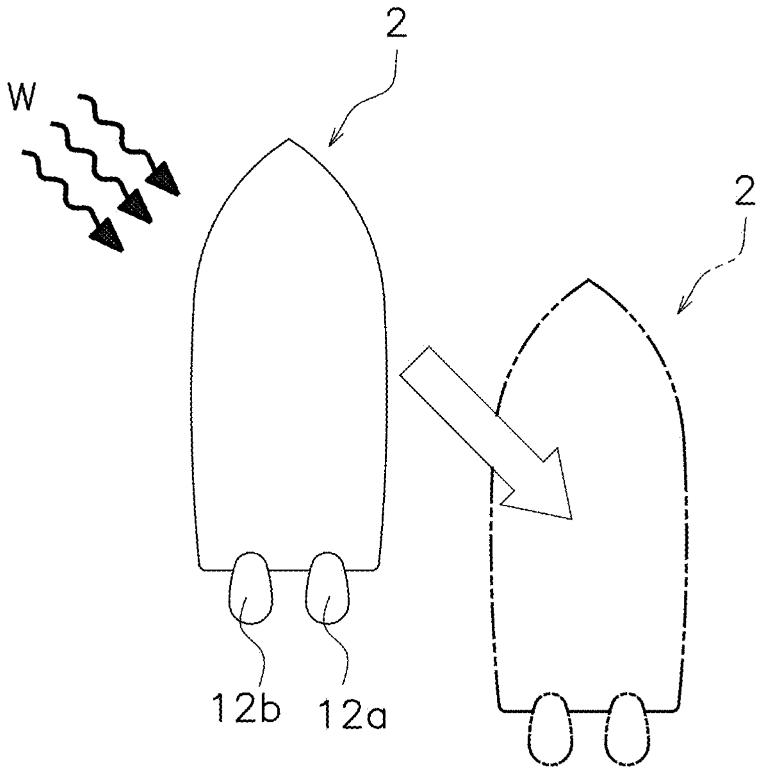
FIG. 5 is a diagram for explaining a compass direction maintaining function.

The compass direction maintaining function (Drift Point™ function) is provided as one of the fishing-related watercraft operating functions. For example, the compass direction maintaining function is used to conduct trolling. Under the compass direction maintaining function, the watercraft 2 moves along the wind or tide, while the compass direction thereof is maintained. FIG. 5 is a diagram for explaining the compass direction maintaining function. In FIG. 5, the compass direction maintaining function is executed such that the orientation of the watercraft 2 is fixed in a condition of wind W blowing from the port bow side to the starboard stern side of the watercraft 2. When the compass direction maintaining function is selected with the input 44, as shown in FIG. 5, the watercraft operating controller 47 controls each marine propulsion device 12*a*, 12*b* such that the watercraft 2 can be kept oriented in a predetermined compass direction based on the compass direction signal transmitted to the watercraft operating controller 47 from the compass direction sensor 46. In FIG. 5, the watercraft 2 moved by the wind W is depicted with dashed two-dotted line.

The predetermined navigation function (Pattern Steer function) is provided as one of the fishing-related watercraft operating functions. Under the predetermined navigation function, the watercraft 2 is caused to navigate in a sea route pattern that is preliminarily set. A plurality of sea route patterns can be set in the predetermined navigation function. The operator is allowed to select, with the input 44, any one of a plurality of sea route patterns in the predetermined navigation function. For example, the predetermined navigation function may be used to search for a good spot good to fish.

Figure 6:
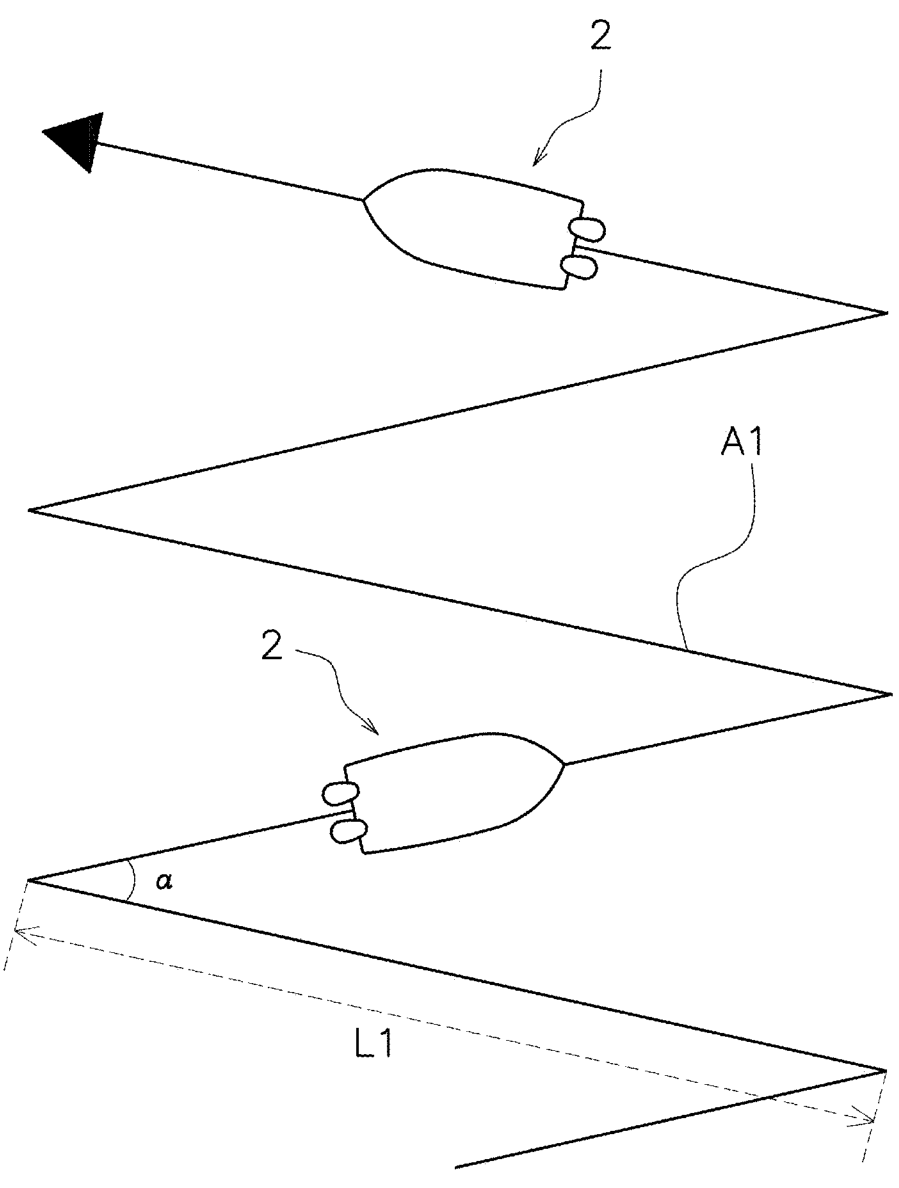
FIG. 6 is a diagram for exemplifying a sea route pattern in a predetermined navigation function.

The plurality of sea route patterns include a first sea route pattern A1, i.e., a zigzag pattern depicted in FIG. 6. When the first sea route pattern A1 is selected as the predetermined navigation function, the watercraft operating controller 47 controls each marine propulsion device 12*a*, 12*b* such that the watercraft 2 moves in the zigzag pattern. For example, the first sea route pattern A1 can be set by allowing the operator to input a distance L1 of a straight moving portion of the zigzag pattern and an angle $\alpha$ between the straight moving portions.

Figure 7:
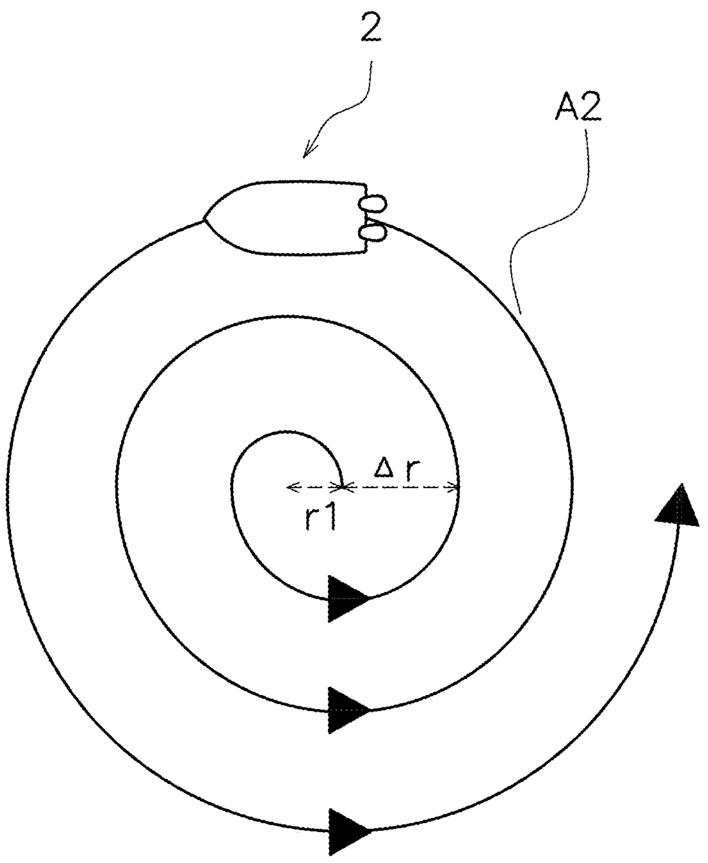
FIG. 7 is a diagram for exemplifying another sea route pattern in the predetermined navigation function.

The plurality of sea route patterns include a second sea route pattern A2, i.e., a spiral pattern depicted in FIG. 7. When the second sea route pattern A2 is selected as the predetermined navigation function, the watercraft operating controller 47 controls each marine propulsion device 12*a*, 12*b* such that the watercraft 2 moves in the spiral pattern. For example, the second sea route pattern A2 can be set by allowing the operator to input an initial radius r1 and an increase-in-radius Or in the spiral pattern with the input 44.

Figure 8:
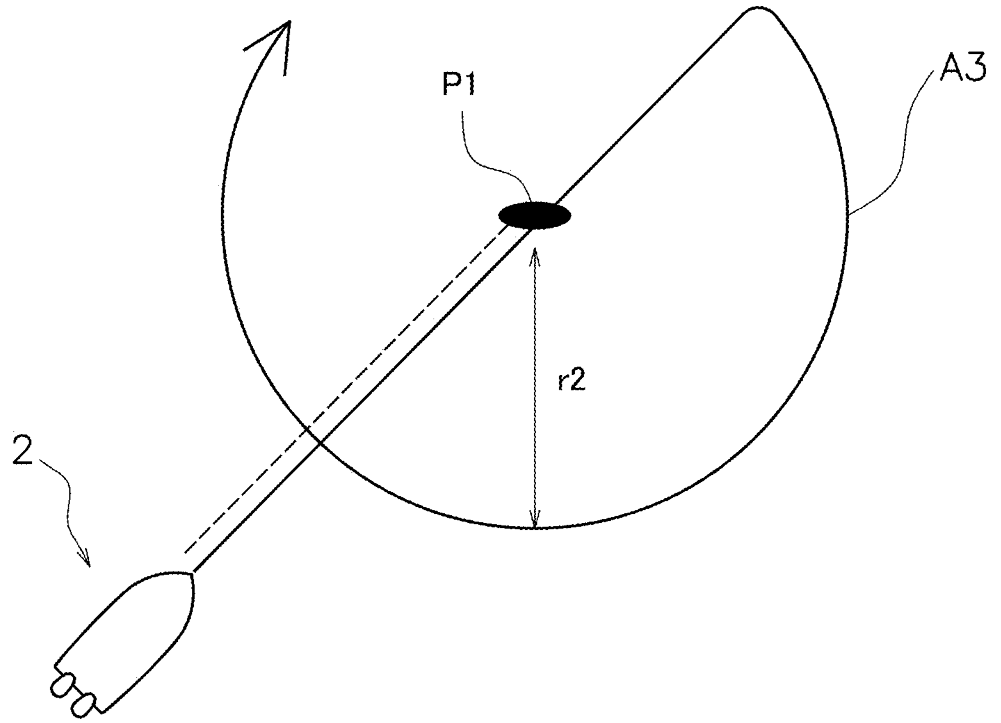
FIG. 8 is a diagram for exemplifying yet another sea route pattern in the predetermined navigation function.

The plurality of sea route patterns include a third sea route pattern A3 depicted in FIG. 8. In the third sea route pattern A3, the watercraft 2 passes through a target position and then navigates about the target position. When the third sea route pattern A3 is selected as the predetermined navigation function, the watercraft operating controller 47 controls each marine propulsion device 12*a*, 12*b* such that the watercraft 2 passes through a predetermined position P1 and then moves along a circle with a radius r2 about the predetermined position P1. For example, the third sea route pattern A3 can be set by allowing the operator to input the predetermined position P1 and the radius r2 with the input 44.

Figure 9:
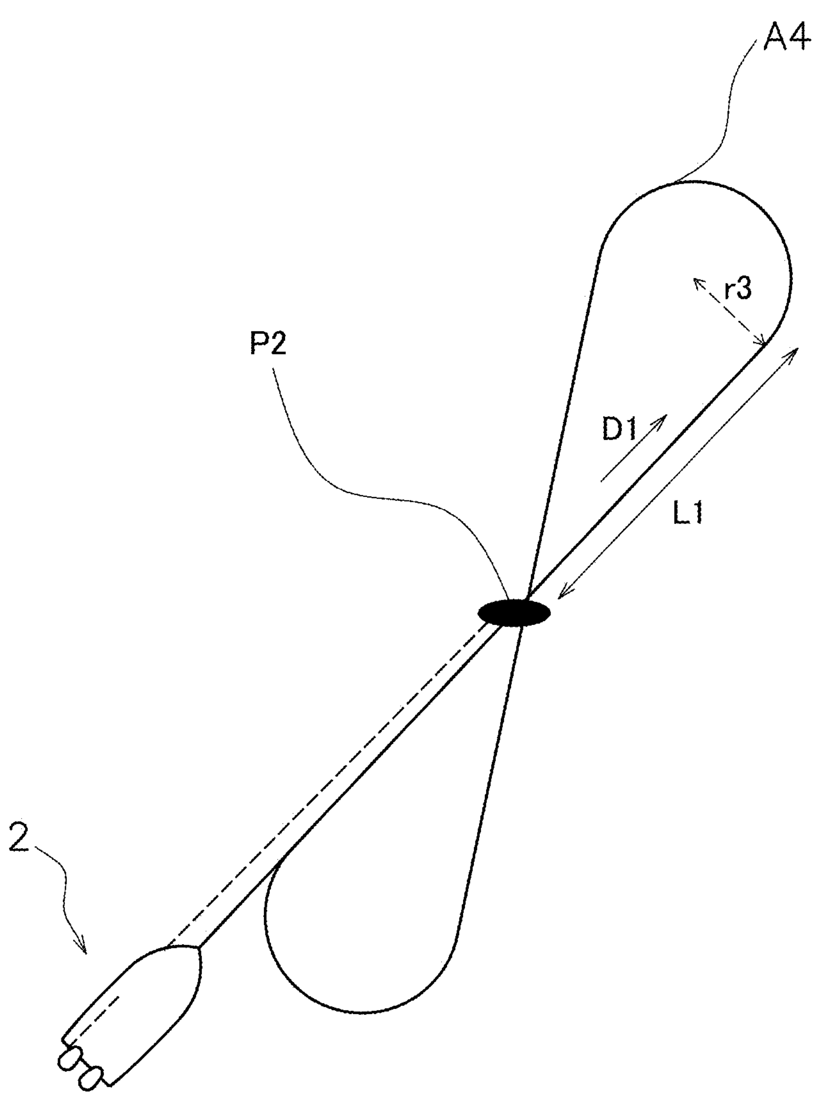
FIG. 9 is a diagram for exemplifying still another sea route pattern in the predetermined navigation function.

The plurality of sea route patterns include a fourth sea route pattern A4 depicted in FIG. 9 such that the watercraft 2 navigates along a FIG. 8 shaped route, in the center of which a target position is located. When the fourth sea route pattern A4 is selected as the predetermined navigation function, the watercraft operating controller 47 controls each marine propulsion device 12*a*, 12*b* such that the watercraft 2 moves along the FIG. 8 shaped route, in the center of which a predetermined position P2 is located. For example, the fourth sea route pattern A4 can be set by allowing the operator to input the predetermined position P2, a moving distance L1 by which the watercraft 2 moves from the predetermined position P2 along an approach direction D1, and a rotation radius r3.

Figure 10:
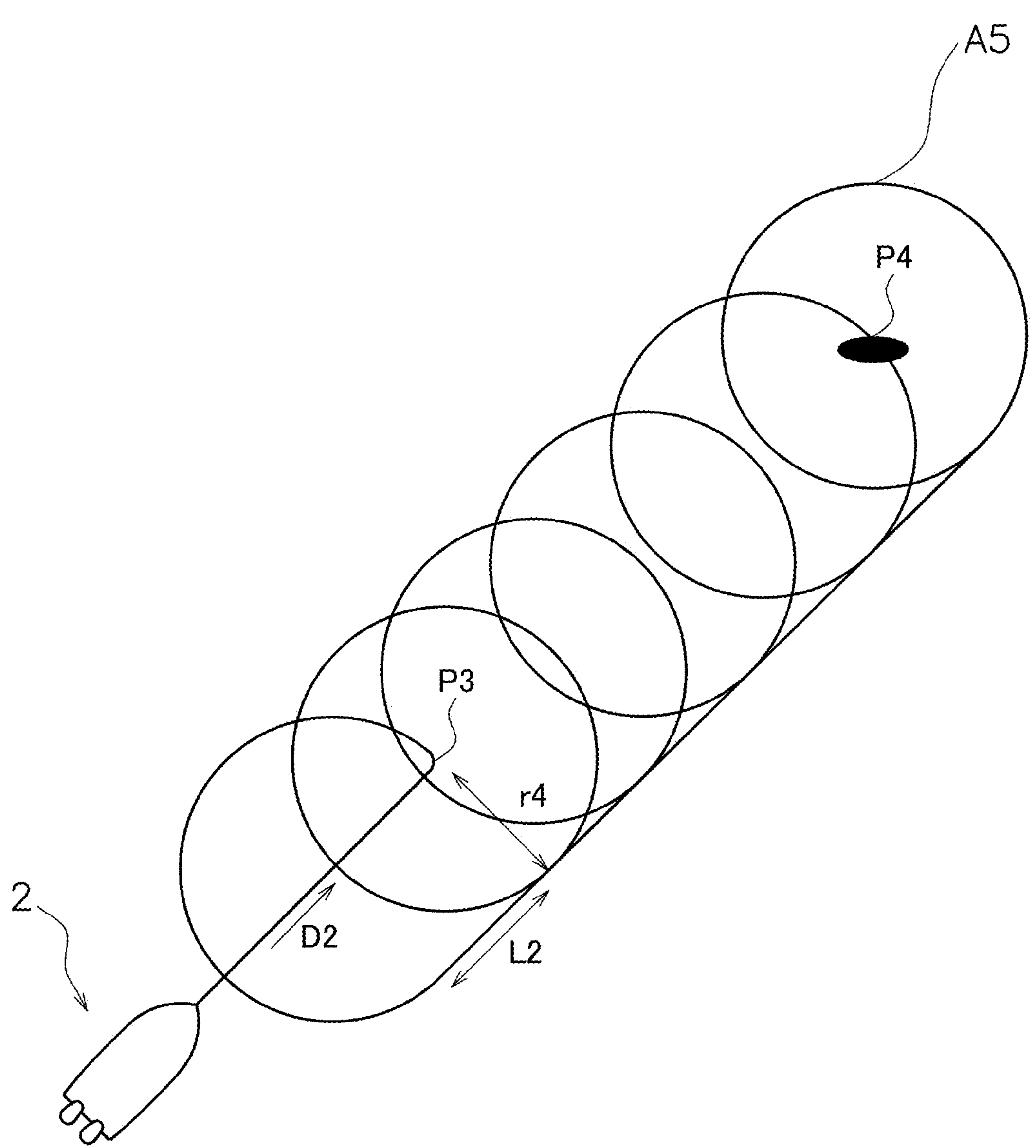
FIG. 10 is a diagram for exemplifying still yet another sea route pattern in the predetermined navigation function.

The plurality of sea route patterns include a fifth sea route pattern A5 depicted in FIG. 10 such that the watercraft 2 moves in a predetermined direction, while forming circles. When the fifth sea route pattern A5 is selected as the predetermined navigation function, the watercraft operating controller 47 controls each marine propulsion device 12*a*, 12*b* such that the watercraft 2 moves from a start position P3 in a circular shape and then moves by a distance L2 from a position oriented in the same direction as an approach direction D2. For example, the fifth sea route pattern A5 can be set by allowing the operator to input the start position P3, a rotation radius r4, the distance L2, and an end position P4 with the input 44.

As shown in FIG. 3, the watercraft 2 includes a DCM (Data Communication Module) 48 (an example of a communication device). The DCM 48 is connected to the watercraft operating controller 47. The DCM 48 transmits the following to the cloud server 3: a fishing-related information signal indicating an executed fishing-related watercraft operating function and execution information regarding the executed fishing-related watercraft operating function. The executed fishing-related watercraft operating function is selected and executed from among the functions described above, i.e., the position maintaining function, the compass direction maintaining function, and the predetermined navigation function. The execution information includes a site, time, air temperature, water temperature, and weather conditions, all of which are obtained during execution of the fishing-related watercraft operating function. The site is outputted, as the position signal, to the watercraft operating controller 47 by the position sensor 45. The time, air temperature, water temperature, and weather conditions are transmitted, as weather signals, to the watercraft operating controller 47 by the MFD 43. The watercraft operating controller 47 outputs the fishing-related information signal to the DCM 48, while the execution information regarding execution of the fishing-related watercraft operating function is associated with the executed fishing-related watercraft operating function. The watercraft operating controller 47 may cause the DCM 48 to transmit the fishing-related information signal to the cloud server 3, while the fishing result information, inputted to the input 44, is added to the executed fishing-related watercraft operating function and the execution information as the fishing-related information signal. It should be noted that the fishing-related information signal may not be necessarily transmitted to the cloud server 3 from the single watercraft 2. Alternatively, the fishing-related information signals may be transmitted to the cloud server 3 from a plurality of watercraft 2. The DCM 48 receives a fishing site information signal (to be described below) transmitted from the cloud server 3.

As shown in FIG. 3, the cloud server 3 includes a reception section 51, an estimation section 52, and a transmission section 53. The reception section 51 receives the fishing-related information signal from each of the single or plurality of watercraft 2. The estimation section 52 estimates a recommended fishing site or a recommended sea route based on the fishing-related information signal received by the reception section 51. For example, the estimation section 52 sets a sea area, in which a predetermined one of the fishing-related watercraft operating functions has been executed in a large number of positions or locations, as the recommended fishing site or sea route. The transmission section 53 transmits the fishing site information signal indicating the recommended fishing site or the recommended sea route estimated by the estimation section 52, to the DCM 48. The fishing site information, transmitted from the cloud server 3, is displayed on the MFD 43.

Figure 11:
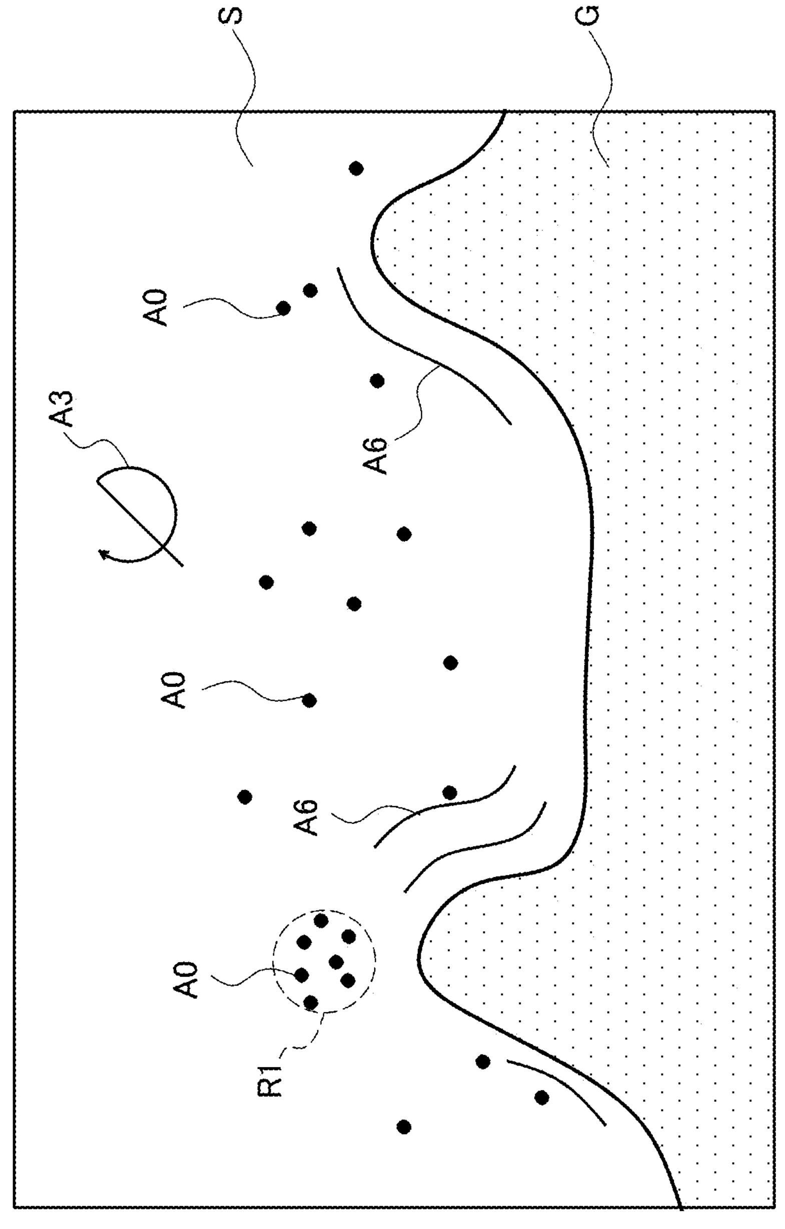
FIG. 11 a diagram for explaining estimation of a recommended fishing site.

Next, estimation of a recommended fishing site by the estimation section 52 will be explained. FIG. 11 is a diagram for explaining estimation of a recommended fishing site. In FIG. 11, a land is denoted by G, while the sea is denoted by S. Positions, in which the position maintaining function has been executed, are depicted as points A0. Sea routes, in which the compass direction maintaining function has been executed, are depicted as sea route patterns A6.

As shown in FIG. 11, the estimation section 52 estimates a sea area, in which the position maintaining function has been executed in a large number of positions, as a recommended sea area R1 recommended for fishing (exemplary recommended fishing site). For example, when the points A0 are greater or equal in number to a predetermined value within a range of a predetermined distance, the estimation section 52 is able to estimate a sea area satisfying the condition as the recommended fishing site.

Figure 12:
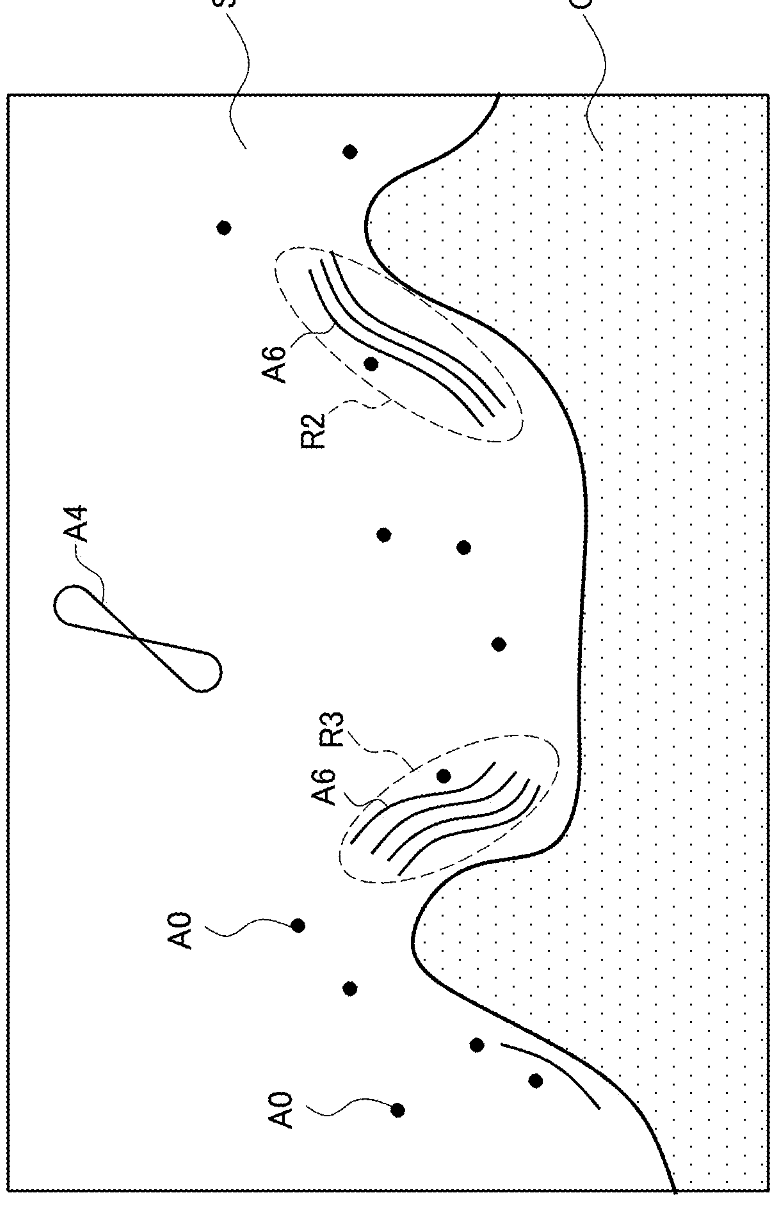
FIG. 12 is a diagram for explaining estimation of recommended fishing sites.

As shown in FIG. 12, the estimation section 52 estimates a sea area, in which the compass direction maintaining function has been executed in a large number of sea routes, as recommended sea areas R2 and R3 recommended for fishing (an example of a recommended fishing site or recommended sea route). For example, when the sea route pattern A6 is greater or equal in number to a predetermined value within a range of a predetermined distance, the estimation section 52 is able to set a sea area satisfying the condition as the recommended fishing site. In FIG. 12, two recommended sea areas R2 and R3 recommended for fishing are depicted.

Figure 13:
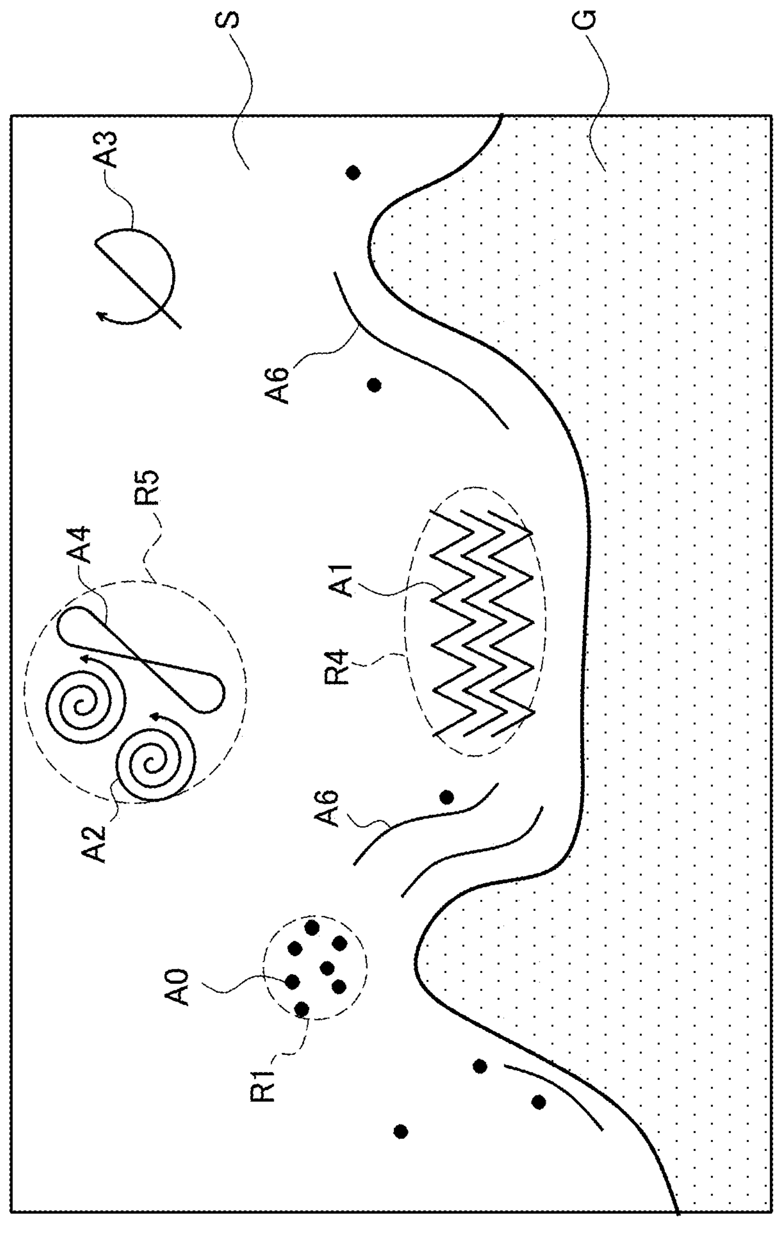
FIG. 13 is a diagram for explaining estimation of recommended fishing sites.

As shown in FIG. 13, the estimation section 52 estimates a sea area, in which the predetermined navigation function has been executed in a large number of sea routes, as recommended sea areas R4 and R5 recommended for fishing (an example of a recommended fishing site or recommended sea route). For example, when sea route patterns A1 to A5 are greater or equal in number to a predetermined value within a range of a predetermined distance, the estimation section 52 is able to set a sea area satisfying the condition as the recommended fishing site. It should be noted that sea areas, in each of which each type of sea route patterns A1 to A5 exists in a large number, may be detected and estimated as the recommended sea areas. It should be noted that the recommended sea area R1, in which the position maintaining function has been executed in a large number of positions, is also depicted in FIG. 13.

The estimation section 52 may estimate a sea area recommended for fishing based on the fishing result information inputted to the input 44. For example, among the sea areas R1, R4, and R5, only the one in which the best fishing result has been obtained may be estimated as the recommended sea area. In this case, the fishing site information signal, indicating only the information of the recommended sea area without including the information of the other sea areas, may be transmitted to the DCM 48. Additionally, the fishing site information may be transmitted to the DCM 48, while the sea areas are ranked or graded as a recommendation grade such that the recommendation grade becomes higher as the fishing result becomes better.

Figure 14:
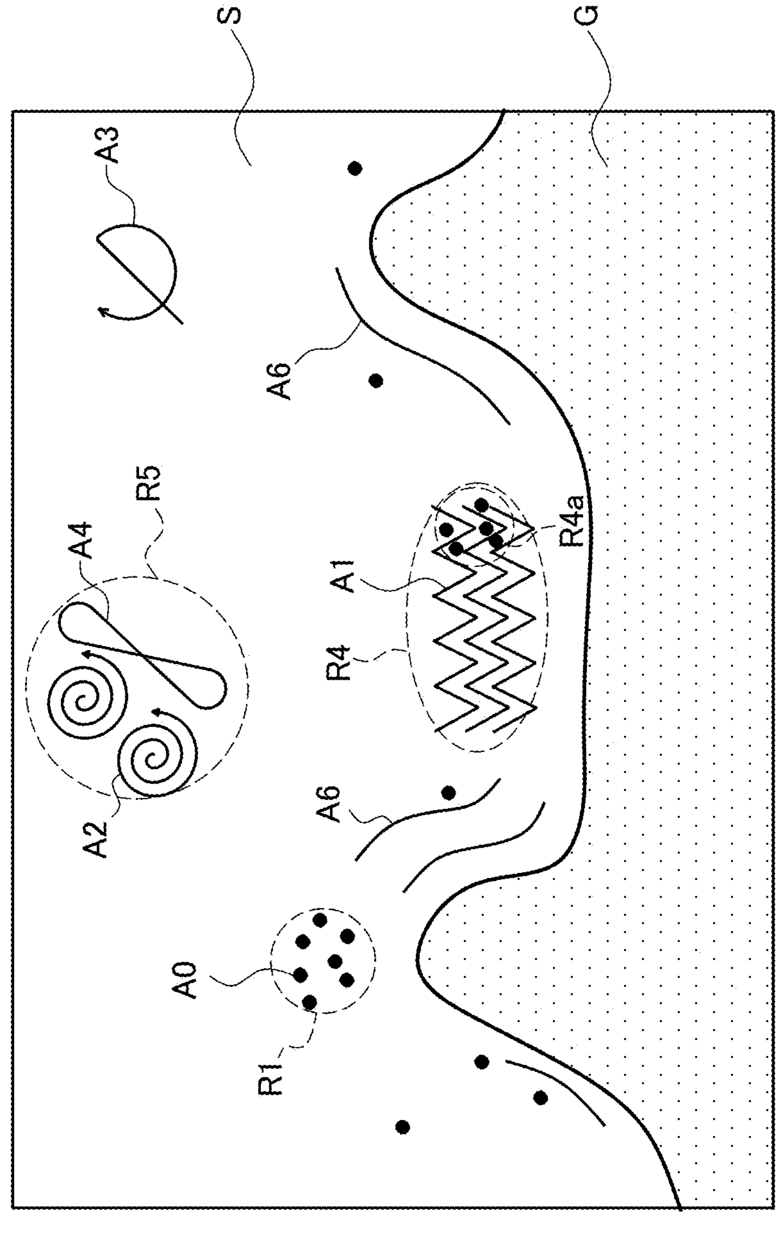
FIG. 14 is a diagram for explaining estimation of recommended fishing sites.

When the plurality of fishing-related watercraft operating functions are executed, the estimation section 52 may estimate a sea area recommended for fishing based on a combination of the plurality of fishing-related watercraft operating functions and the execution information regarding each fishing-related watercraft operating function. For example, when the position maintaining function has been executed after execution of the predetermined navigation function, it is deducible that, after searching for fish, fishing has been conducted at a fishing point found by the search. Thus, the position may be estimated as the sea area recommended for fishing. For example, as shown in FIG. 14, after execution of the plurality of first sea route patterns A1 in the predetermined navigation function, the position maintaining function has been executed in the plurality of points A0. Thus, a sea area R4*a* within the sea area R4 may be estimated as the recommended sea area.

The estimation section 52 may transmit the fishing site information signal to the DCM 48, while one of the recommended sea areas that is estimated based on a combination of the plurality of fishing-related watercraft operating functions, is set as a higher recommendation grade than the others.

The estimation section 52 may transmit the fishing site information signal to the DCM 48, while one of the recommended sea areas that is estimated based on execution of a specific one of the plurality of fishing-related watercraft operating functions and the execution information regarding the specific fishing-related watercraft operating function, is set as a higher recommendation grade than the others. For example, in FIG. 13, when the position maintaining function is set as the specific fishing-related watercraft operating function, the recommended sea area R1, in which the position maintaining function has been executed, is able to be set as a higher recommendation grade than the other recommended sea areas R4 and R5.

The estimation section 52 may transmit the fishing site information signal to the DCM 48, while one of the recommended sea areas in which environmental information (including air temperature, water temperature, and weather conditions) obtained during execution of the fishing-related watercraft operating function is the closest to the present environmental information, is set as a higher recommendation grade than the others. For example, when the recommended sea areas R1, R4, and R5 are different in water temperature from each other in FIG. 13 and the water temperature in the recommended sea area R4 is the closest to the present water temperature, the fishing site information signal is transmitted to the DCM 48, while the recommended sea area R4 is set as a higher recommendation grade than the other recommended sea areas R1 and R5.

The estimation section 52 may set one of the recommended sea areas as a higher recommendation grade than the others based on the one executed recently among the fishing-related watercraft operating functions. For example, when a clock time, at which the predetermined navigation function has been executed in the recommended sea area R4, is the closest to the present clock time in FIG. 13, the fishing site information signal is transmitted to the DCM 48, while the recommended sea area R4 is set as a higher recommendation grade than the other recommended sea areas R1 and R5.

Figure 15:
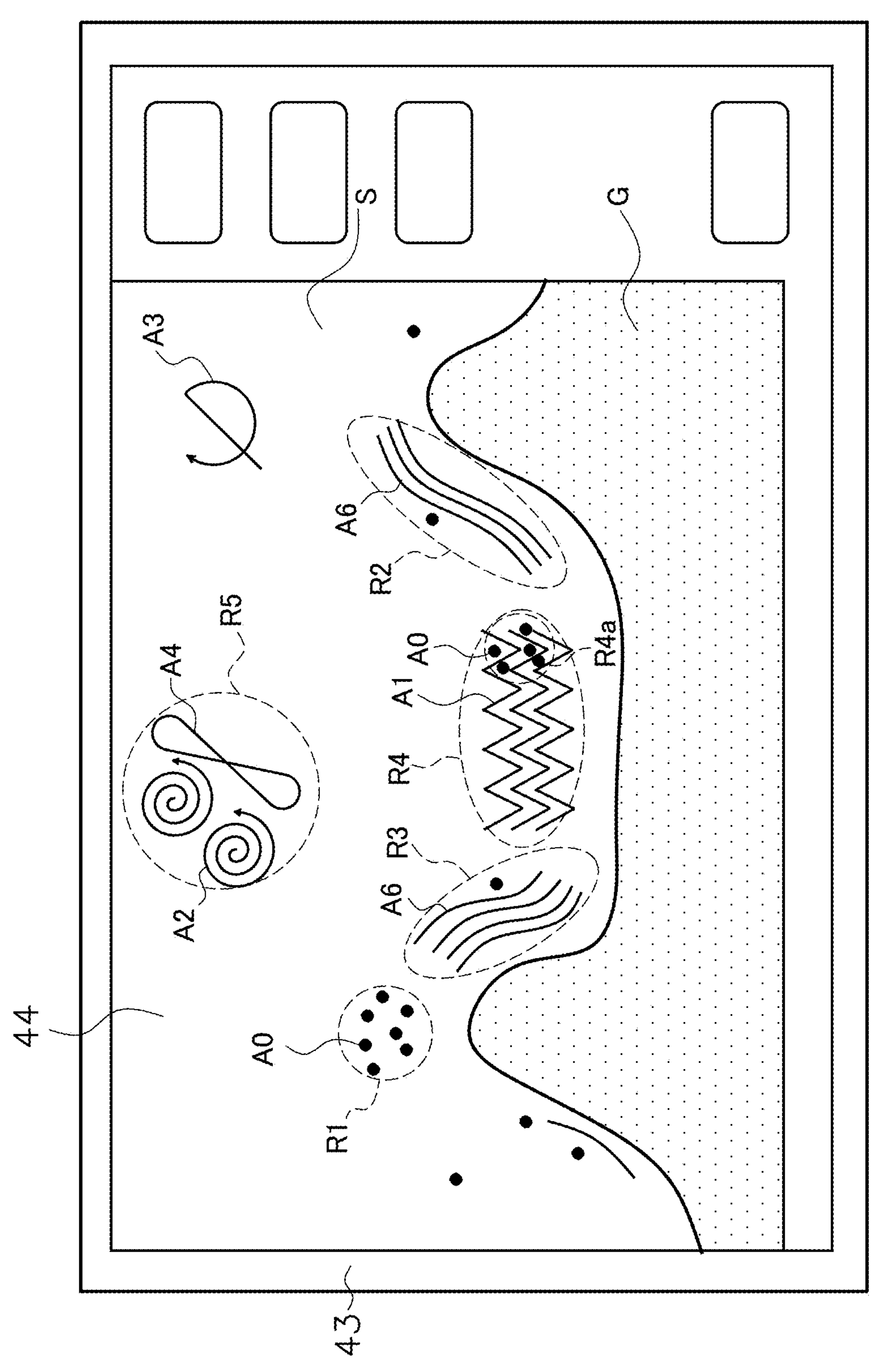
FIG. 15 is a diagram exemplifying a screen displayed on an MFD.

The fishing site information, transmitted to the DCM 48, is displayed on the MFD 43. FIG. 15 is a diagram exemplifying a screen displayed on the MFD 43. As shown in FIG. 15, the recommended sea areas R1 to R5 are displayed on the MFD 43. The MFD 43 may display the recommended sea areas R1 to R5 in an arbitrary manner as long as the recommended sea areas R1 to R5 are recognizable by the operator. The MFD 43 can display the recommended sea areas R1 to R5 on the nautical chart by, for instance, enclosing the outline of each recommended sea area with a line or painting the recommended sea areas in different colors.

When receiving the fishing site information through the DCM 48, the MFD 43 displays one of the recommended sea areas, which has a higher recommendation grade than the others, with higher priority than the others. For example, the recommended sea area that has a higher recommendation grade than the others may be displayed with a higher priority than the others on the MFD 43 by blinking the line enclosing the recommended sea area having the higher recommendation grade than the others or illustrating the recommended sea area having a higher recommendation grade than the others with a different color from the others. The lines enclosing the recommended sea areas may be increased in brightness or saturation according to the recommendation grade. Alternatively, only the recommended sea area having a higher recommendation grade than the others may be displayed firstly, then the others may be sequentially displayed by, for instance, tapping the screen.

When the operator selects any one recommended sea area from the recommended sea areas R1 to R5 recommended for fishing that are displayed on the MFD 43, the watercraft operating controller 47 controls each marine propulsion device 12*a*, 12*b* such that the watercraft 2 automatically moves to a selected fishing site or such that the watercraft 2 automatically moves along a selected sea route. For example, when the recommended sea area R1 is selected, the watercraft operating controller 47 automatically moves the watercraft 2 to the recommended sea area R1 as the selected fishing site. For example, when the recommended sea area R2, R3, R4, or R5 is selected, the watercraft operating controller 47 automatically navigates the watercraft 2 to the recommended sea area R2, R3, R4, or R5 and then automatically moves the watercraft 2 along the recommended sea area R2, R3, R4, or R5 as the selected sea route. It should be noted that in FIG. 15, a plurality of recommended sea areas recommended for fishing are displayed on the MFD 43. Alternatively, only one recommended sea area recommended for fishing may be displayed thereon.

The watercraft operating controller 47 may automatically move the watercraft 2 to the selected recommended sea area, and then, may execute the fishing-related watercraft operating function that has been executed in the selected recommended sea area. For example, when the operator selects the recommended sea area R1, the watercraft operating controller 47 automatically moves the watercraft 2 to the recommended sea area R1, and then, controls each marine propulsion device 12*a*, 12*b* to automatically execute the position maintaining function. When the operator selects the recommended sea area R2, the watercraft operating controller 47 automatically moves the watercraft 2 to the recommended sea area R2, and then, controls each marine propulsion device 12*a*, 12*b* to automatically execute the compass direction maintaining function. When the operator selects the recommended sea area R4, the watercraft operating controller 47 automatically moves the watercraft 2 to the recommended area R4, and then, controls each marine propulsion device 12*a*, 12*b* to automatically execute the zigzag-shaped sea route pattern A1 under the predetermined navigation function.

Figure 16:
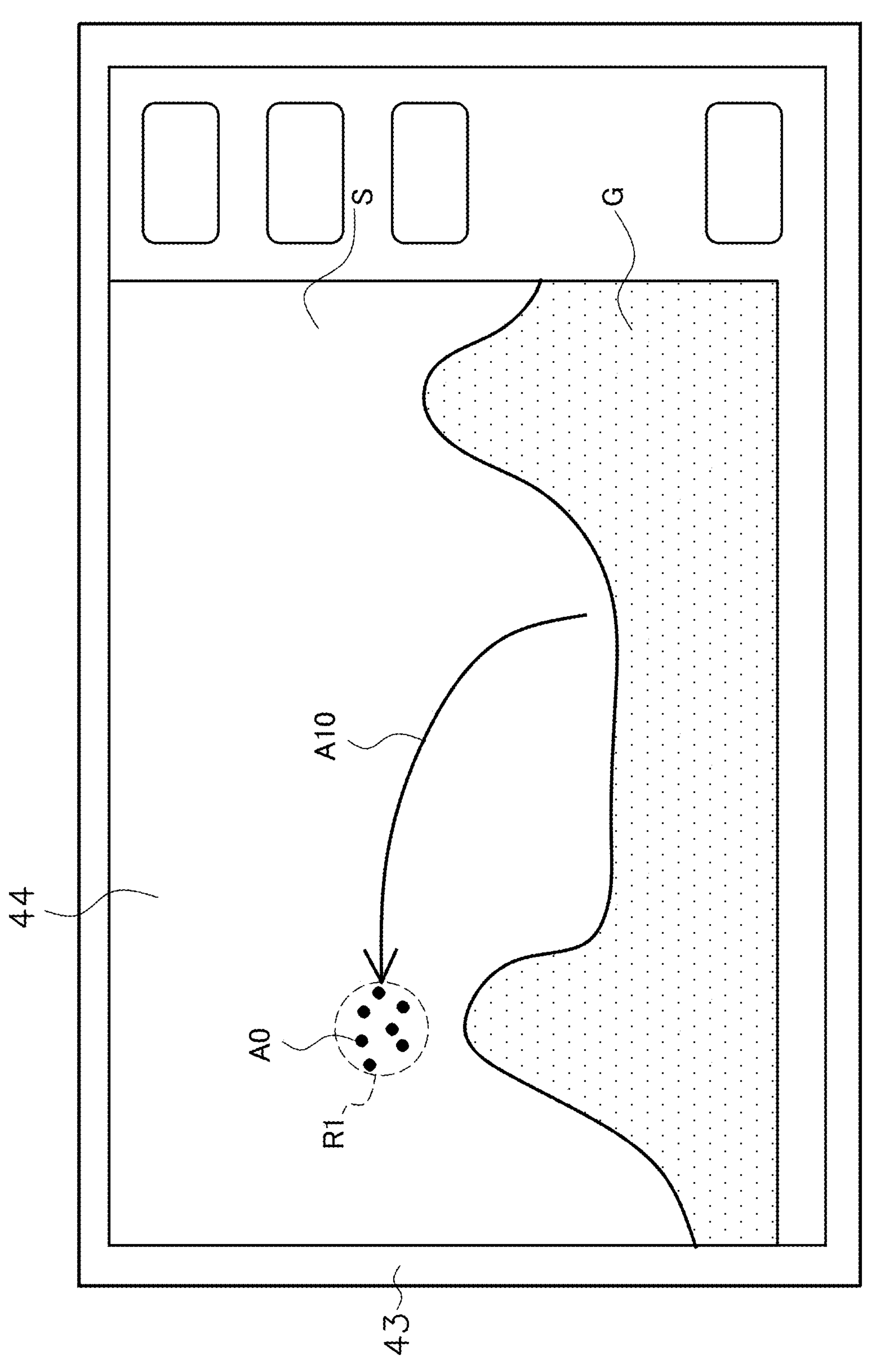
FIG. 16 is a diagram exemplifying another screen displayed on the MFD.

The watercraft 2 may not be automatically moved to the recommended sea area selected by the operator as described above. When the operator selects any one of the recommended sea areas R1 to R5 that are displayed on the MFD 43, the watercraft operating controller 47 may display a sea route toward the selected sea area on the MFD 43. FIG. 16 shows that, when the recommended sea area R1 is selected, a sea route A10 toward the recommended sea area R1 is displayed on the display screen. The watercraft 2 can be moved toward the recommended sea area desired by the operator by allowing the operator to operate the watercraft 2 based on the sea route.

Figure 17:
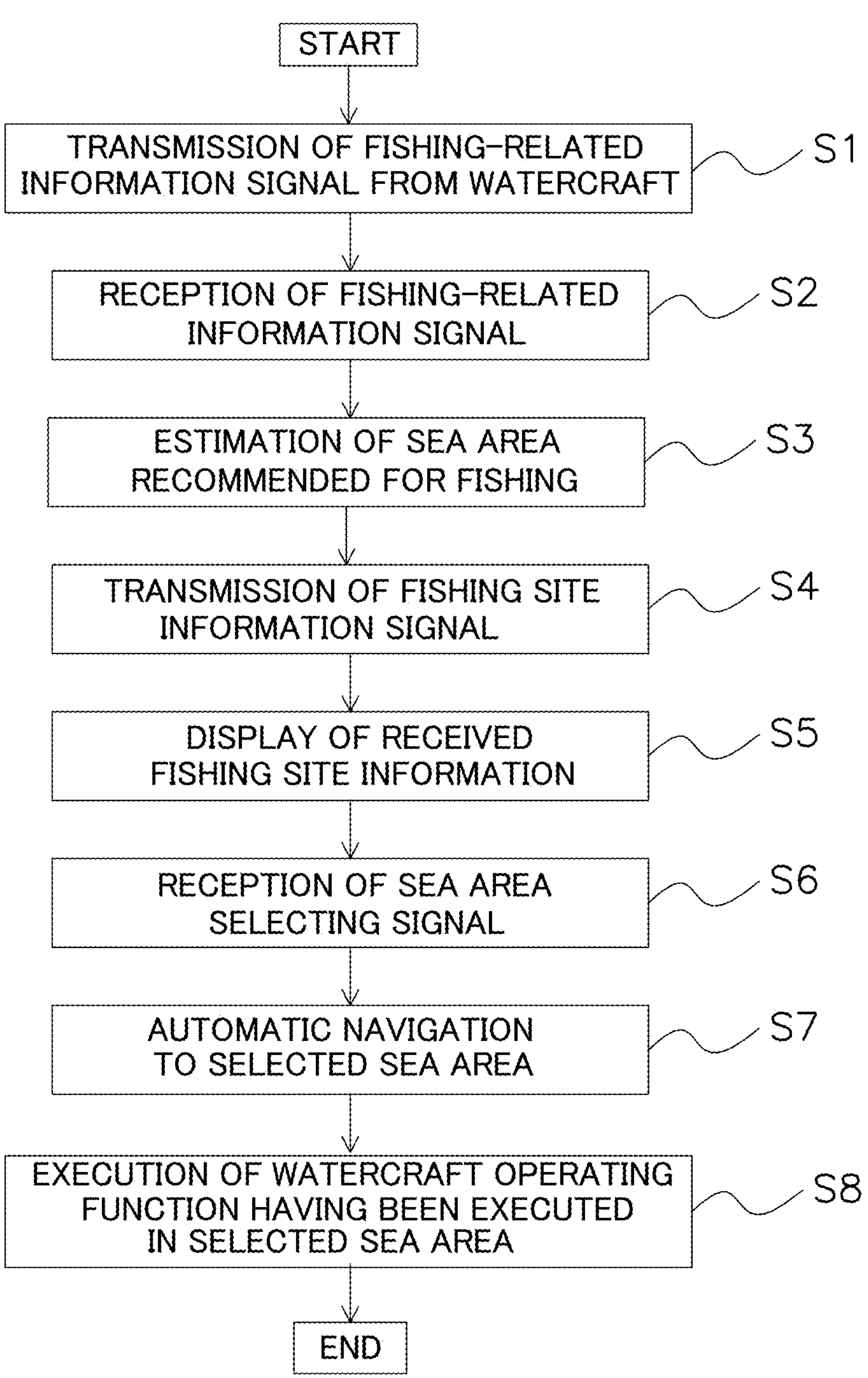
FIG. 17 is a flowchart showing a series of actions performed by the fishing site information providing system.

Next, a series of actions performed by the fishing site information providing system according to the present example embodiment will be exemplified. FIG. 17 is a flowchart showing a series of actions performed by the fishing site information providing system.

First, in step S1, the watercraft 2 transmits a fishing-related information signal, including an executed one of the fishing-related watercraft operating functions and execution information regarding the executed fishing-related watercraft operating function, from the DCM 48 to the cloud server 3. The fishing-related information signal may be transmitted every time the fishing-related watercraft operating function is executed. Alternatively, the fishing-related information signals may be collectively transmitted at predetermined intervals of time.

Next, in step S2, the cloud server 3 receives the fishing-related information signal from the watercraft 2. It is preferable for the cloud server 3 to receive the fishing-related information signals from a plurality of watercraft 2.

Next, in step S3, the estimation section 52 of the cloud server 3 estimates a recommended sea area recommended for fishing based on the executed one of the fishing-related watercraft operating functions and the execution information regarding the executed fishing-related watercraft operating function, both of which are indicated by the received fishing-related information signal.

Next, in step S4, the transmission section 53 of the cloud server 3 transmits the fishing site information signal, indicating fishing site information of the recommended sea area estimated above, to the watercraft 2. The fishing site information signal may be transmitted to only the watercraft 2 requesting the cloud server 3 to provide the fishing site information thereto. Alternatively, the fishing site information may be transmitted to all of a single or a plurality of watercraft 2 existing in the recommended sea area relevant to the fishing site information to be provided.

Next, in step S5, the watercraft 2 displays the fishing site information of the recommended sea area on the MFD 43 based on the fishing site information signal received through the DCM 48. For example, as shown in FIG. 15, the recommended sea areas R1 to R5 recommended for fishing are displayed on the MFD 43.

Next, in step S6, when the operator selects any of the recommended sea areas R1 to R5 with the input 44, the watercraft operating controller 47 receives the sea area selecting signal from the input 44.

Next, in step S7, the watercraft operating controller 47 controls each marine propulsion device 12*a*, 12*b* such that the watercraft 2 automatically moves to the selected one of the recommended sea areas. In step S7, instead of automatically moving the watercraft 2 to the selected recommended sea area, a sea route toward the selected recommended sea area may be displayed on the MFD 43 as shown in FIG. 16.

Next, in step S8, when the watercraft 2 reaches the selected recommended sea area, the watercraft operating controller 47 executes the fishing-related watercraft operating function that has been executed in the selected recommended sea area. It should be noted that the fishing-related watercraft operating function may be automatically executed after the watercraft 2 reaches the recommended sea area. Alternatively, the fishing-related watercraft operating function may be executed when the operator selects execution of the fishing-related watercraft operating function. For example, the following control may be executed: When the watercraft 2 reaches the selected recommended sea area, the MFD 43 displays a button to select whether or not to execute the fishing-related watercraft operating function that has been executed in the selected recommended sea area. Then, when the button is operated by the operator to select execution of the fishing-related watercraft operating function, the watercraft operating controller 47 executes the fishing-related watercraft operating function.

As described above, when the fishing-related watercraft operating function is executed in the watercraft 2, it is thus deduced that fishing has been conducted in the site where the fishing-related watercraft operating function has been executed. Thus, it is possible to accurately determine whether or not fishing has been conducted.

The fishing-related watercraft operating function and the execution information are transmitted from the watercraft 2 to the cloud server 3, thus, manual input work is not required for the operator. In other words, it is possible to accumulate information related to fishing in the cloud server 3 without requiring the operator to perform bothersome work.

This makes it possible for the server to estimate a recommended fishing site and suggest to the operator the recommended fishing site without requiring the operator to perform bothersome work.

Example embodiments of the present invention have been explained above. However, the present invention is not limited to the example embodiments described above, and a variety of changes can be made without departing from the gist of the present invention.

In the example embodiments described above, the DCM 48 is installed in the watercraft 2 as a device to communicate with the cloud server 3. However, the communication device is not limited to the DCM 48. For example, a mobile terminal, brought onto the watercraft 2, may be connected with the watercraft operating controller 47 and the cloud server 3. In this case, the fishing-related information signal is transmitted from the mobile terminal to the cloud server 3. Additionally, the fishing site information signal, transmitted from the cloud server 3, is received by the watercraft operating controller 47 through the mobile terminal. Moreover, the operator may input the fishing result information not to the MFD 43 but instead to the mobile terminal.

In the example embodiments described above, each marine propulsion device 12*a*, 12*b* is described as the outboard motor. However, each marine propulsion device 12*a*, 12*b* may be another type of device without being limited to the outboard motor. For example, each marine propulsion device 12*a*, 12*b* may be an inboard engine outboard drive or a jet propulsion device.

According to the example embodiments of the present invention, it is possible to provide fishing site information providing systems, fishing site information providing methods, and servers to determine accurately, without requiring an operator to perform bothersome work, that fishing has been conducted and suggest to the operator a recommended fishing site.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fishing site information providing system comprising:
- a server; and
- a watercraft including:
  - a position detector to detect a position of the watercraft;
  - a marine propulsion device;
  - an input operable by an operator to select a fishing-related watercraft operating function of the marine propulsion device; and
  - a controller connected to the input and configured or programmed to control the marine propulsion device to execute the fishing-related watercraft operating function selected by the operator; wherein
- the controller is connectable to a communication device and a display;
- the communication device is operable to transmit to the server the fishing-related watercraft operating function executed by the marine propulsion device and execution information including a site of execution of the fishing-related watercraft operating function;
- the server is configured or programmed to estimate a recommended fishing site or sea route based on the fishing-related watercraft operating function and the execution information, and transmit the recommended fishing site or estimated sea route to the communication device;
- the controller is configured or programmed to control the display to display the recommended fishing site or sea route estimated by the server;
- the fishing-related watercraft operating function includes a position maintaining function and a predetermined navigation function;
- the position maintaining function maintains the watercraft in a predetermined position, and the predetermined navigation function navigates the watercraft in a predetermined sea route pattern; and
- the server is configured or programmed to estimate (1) a sea area as the recommended fishing site when the position maintaining function has been executed a number of times greater or equal to a first predetermined value and within a range of a first predetermined distance after execution of the predetermined navigation function, or (2) a sea route to the sea area as the recommended sea route when the predetermined navigation function has been executed a number of times greater or equal to a second predetermined value and within a range of a second predetermined distance.

2. The fishing site information providing system according to claim 1, wherein the controller is configured or programmed to control the marine propulsion device such that the watercraft automatically moves to the recommended fishing site estimated by the server or such that the watercraft automatically moves along the recommended sea route estimated by the server.

3. The fishing site information providing system according to claim 1, wherein when the marine propulsion device executes a plurality of types of fishing-related watercraft operating functions including the fishing-related watercraft operating function, the server is configured or programmed to estimate the recommended fishing site or sea route for each of the plurality of types of fishing-related watercraft operating functions executed by the marine propulsion device; and the controller is configured or programmed to control the display to display the recommended fishing site or sea route for the each of the plurality of types of fishing-related watercraft operating functions executed by the marine propulsion device.

4. The fishing site information providing system according to claim 3, wherein the watercraft further includes a selector operable by the operator to select the recommended fishing site or sea route displayed on the display; and the controller is configured or programmed to control the marine propulsion device such that the watercraft automatically moves to the recommended fishing site selected by the operator or such that the watercraft automatically moves along the recommended sea route selected by the operator.

5. The fishing site information providing system according to claim 3, wherein the watercraft further includes a selector operable by the operator to select the recommended fishing site displayed on the display; and the controller is configured or programmed to control the display to display the sea route toward the recommended fishing site selected by the operator.

6. The fishing site information providing system according to claim 4, wherein, after the watercraft reaches the recommended fishing site selected by the operator, the controller is configured or programmed to execute the fishing-related watercraft operating function among the plurality of types of fishing-related watercraft operating functions in the recommended fishing site selected by the operator.

7. The fishing site information providing system according to claim 5, wherein when the position maintaining function is selected by the operator, the controller is configured or programmed to execute the predetermined navigation function after the watercraft automatically reaches the recommended fishing site selected by the operator.

8. The fishing site information providing system according to claim 1, wherein the fishing-related watercraft operating function includes the position maintaining function, a compass direction maintaining function, or the predetermined navigation function; and the compass direction maintaining function fixes an orientation of the watercraft by maintaining the watercraft in a compass direction.

9. The fishing site information providing system according to claim 1, wherein the execution information includes a time or a weather condition obtained during execution of the fishing-related watercraft operating function.

10. The fishing site information providing system according to claim 1, wherein, when a plurality of fishing-related watercraft operating functions including the fishing-related watercraft operating function have been executed, the server is configured or programmed to further estimate the recommended fishing site based on a combination of the plurality of fishing-related watercraft operating functions and the execution information.

11. The fishing site information providing system according to claim 10, wherein the server is configured or programmed to transmit the recommended fishing site to the communication device by setting the recommended fishing site as a higher recommendation grade than one or more others of a plurality of recommended fishing sites including the recommended fishing site.

12. The fishing site information providing system according to claim 1, wherein the server is configured or programmed to transmit the recommended fishing site to the communication device by setting the recommended fishing site as a higher recommendation grade than one or more others of a plurality of recommended fishing sites including the recommended fishing site when the recommended fishing site is estimated based on execution of a specific one of a plurality of fishing-related watercraft operating functions including the fishing-related watercraft operating function and the execution information regarding the specific fishing-related watercraft operating function.

13. The fishing site information providing system according to claim 1, wherein the execution information includes an air temperature, water temperature, or a weather condition obtained as environmental information during execution of the fishing-related watercraft operating function; and the server is configured or programmed to transmit the recommended fishing site to the communication device by setting the recommended fishing site as a higher recommendation grade than one or more others of a plurality of recommended fishing sites including the recommended fishing site when the environmental information obtained in the recommended fishing site is the closest to present environmental information.

14. The fishing site information providing system according to claim 1, wherein the execution information includes a time obtained during execution of the fishing-related watercraft operating function; and the server is configured or programmed to transmit the recommended fishing site to the communication device by setting the recommended fishing site as a higher recommendation grade than one or more others of a plurality of recommended fishing sites including the recommended fishing site when the recommended fishing site is estimated based on a recently executed one of a plurality of fishing-related watercraft operating functions including the fishing-related watercraft operating function.

15. The fishing site information providing system according claim 11, wherein the controller is configured or programmed to control the display to display the recommended fishing site having a higher recommendation grade than the one or more others of the plurality of recommended fishing sites with a higher priority than the one or more others of the plurality of recommended fishing sites.

16. The fishing site information providing system according to claim 1, wherein the watercraft further includes a fishing result information input operable by the operator to input fishing result information; and the server is configured or programmed to estimate the recommended fishing site based on the fishing-related watercraft operating function, the execution information, and the fishing result information.

17. The fishing site information providing system according to claim 1, wherein the communication device and the display are installed in the watercraft.

18. A fishing site information providing method comprising:

causing a communication device to transmit to a server a fishing-related watercraft operating function executed in a watercraft and execution information including a site of execution of the fishing-related watercraft operating function;

causing the server to estimate a recommended fishing site or sea route based on the fishing-related watercraft operating function and the execution information;

causing the server to transmit to the communication device the recommended fishing site or sea route estimated by the server; and causing a display to display the recommended fishing site or sea route estimated by the server; wherein the fishing-related watercraft operating function includes a position maintaining function and a predetermined navigation function;

the position maintaining function maintains the watercraft in a predetermined position, and the predetermined navigation function navigates the watercraft in a predetermined sea route pattern; and the server estimates (1) a sea area as the recommended fishing site when the position maintaining function has been executed a number of times greater or equal to a first predetermined value and within a range of a first predetermined distance after execution of the predetermined navigation function, or (2) a sea route to the sea area as the recommended sea route when the predetermined navigation function has been executed a number of times greater or equal to a second predetermined value and within a range of a second predetermined distance.

19. A server comprising:

a reception section to receive a fishing-related watercraft operating function executed in a watercraft and execution information including a site of execution of the fishing-related watercraft operating function;

an estimation section to estimate a recommended fishing site or sea route based on the fishing-related watercraft operating function and the execution information; and a transmission section to transmit the recommended fishing site or sea route estimated by the estimation section to a communication device of the watercraft; wherein the fishing-related watercraft operating function includes a position maintaining function and a predetermined navigation function;

the position maintaining function maintains the watercraft in a predetermined position, and the predetermined navigation function navigates the watercraft in a predetermined sea route pattern; and the estimation section estimates (1) a sea area as the recommended fishing site when the position maintaining function has been executed a number of times greater or equal to a first predetermined value and within a range of a first predetermined distance after execution of the predetermined navigation function, or a sea route to the sea area as the recommended sea route when the predetermined navigation function has been executed a number of times greater or equal to a second predetermined value and within a range of a second predetermined distance.

* * * * *